United States Patent Office

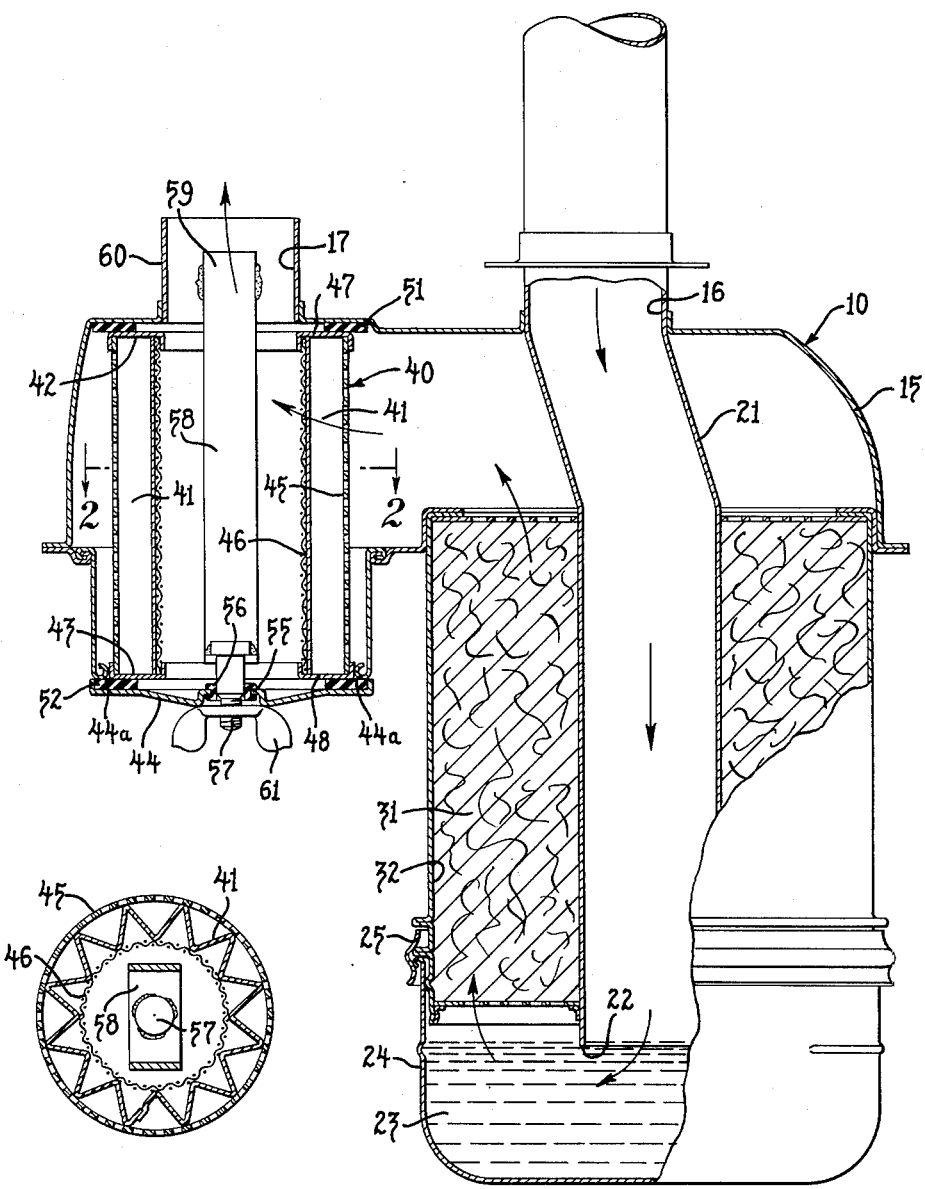

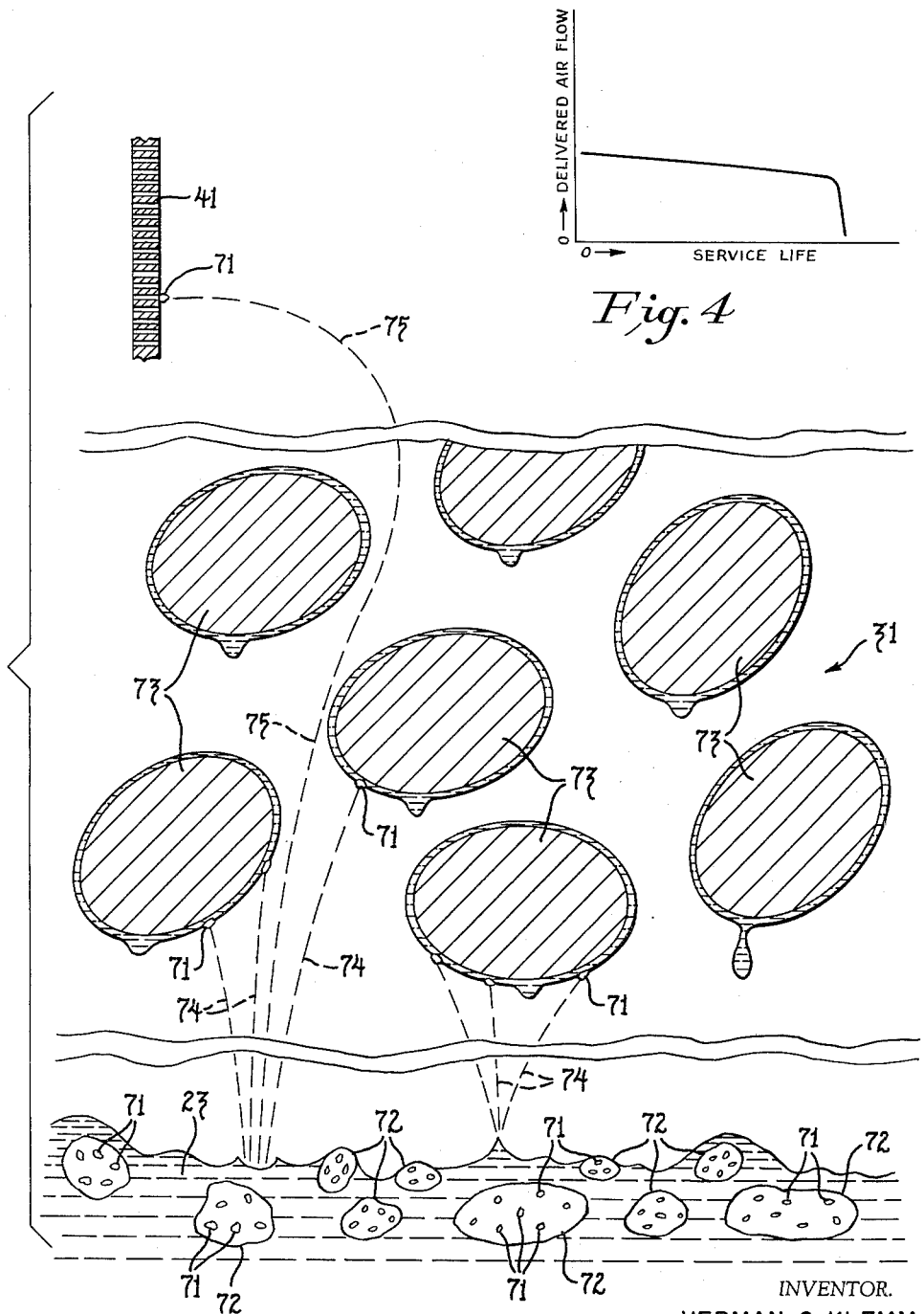

2,988,166
Patented June 13, 1961

2,988,166
AIR CLEANER
Herman G. Klemm, Birmingham, Mich., assignor to Massey-Ferguson Inc., Racine, Wis., a corporation of Maryland
Filed Oct. 30, 1958, Ser. No. 770,790
2 Claims. (Cl. 183—15)

The present invention relates generally to an air intake system for internal combustion engines and concerns more particularly a novel air cleaner assembly for such systems.

The successful operation of an internal combustion engine requires a large volume of relatively clean air, that is, air free of flying foreign material such as particles of dust and dirt. The function of separating foreign material from the incoming air stream is normally performed by the engine air cleaner.

In agricultural equipment, internal combustion engines and their air cleaners are often called upon to operate in regions where the air is heavily laden with flying chaff and stirred-up dust and dirt. Under these conditions, the air cleaner must not only be capable of separating large quantities of foreign particles from the air stream without becoming clogged, but also must be exceptionally efficient to prevent the damaging particles from being drawn into the engine.

With standard types of air cleaners, high efficiency and ability to handle large quantities of foreign material without clogging are usually mutually opposed characteristics. That is, an air cleaner of the positive type which passes the incoming air through an extremely fine mesh filter is efficient since almost all foreign material is trapped on the filter. However, such a cleaner is quickly subject to clogging under difficult conditions as the trapped material piles up on the filter. Cleaners of the probability type which do not positively separate foreign particles but rather treat the air stream so that it is highly probable that foreign material is separated, are able to handle much larger quantities of foreign material without choking up. However, these cleaners are less efficient, particularly when operating under the extremely difficult conditions encountered by agricultural equipment.

Accordingly, it is the primary aim of the invention to provide a novel air cleaner assembly of exceptionally high efficiency for keeping dirt and other foreign material out of internal combustion engines. It is a related object to provide such an assembly that is adapted for very heavy-duty use so as to operate effectively with the engines employed in agricultural tractors and other machines which normally are used in regions having a very high concentration of flying dirt.

Furthermore, it is an object to provide an air cleaner assembly having the above characteristics which is compact yet capable of delivering a high volume of filtered air from which there has been positive separation of all foreign particles above a minimum significant size.

It is another object to provide an air cleaner as described above that does not require frequent cleaning or replacement of parts in order to remain effective and efficient.

It is a further object to provide an air cleaner assembly of the type characterized above which will not operate ineffectively. That is, the noval air cleaner will efficiently separate large quantities of foreign material from the air stream passing therethrough until the cleaner requires servicing, at which time the air stream is quickly blocked off to warn the operator that the assembly should be cleaned.

Also, it is an object to provide an air cleaner of the above type having a replaceable filter element which is mounted in a novel manner to facilitate cleaning and replacement.

Moreover, it is an object to provide an air cleaner as characterized above that is economical to manufacture, and trouble free and inexpensive to use.

Other objects and advantages of the invention will become apparent upon reading the following detailed description and upon reference to the drawings in which:

FIGURE 1 is a vertical section of an air cleaner embodying the present invention;

FIG. 2 is a fragmentary section taken along the line 2—2 of FIG. 1;

FIG. 3 is a diagrammatic view showing, in slightly exaggerated form for clarity, the operation of the air cleaner illustrated in FIG. 1; and FIG. 4 is a chart illustrating an operating characteristic of the air cleaner shown in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to FIGURE 1, there is shown an air cleaner 10 embodying the invention and adapted for installation in the air intake system of an internal combustion engine (not shown). The cleaner 10 includes a housing 15 which is provided with air intake and air delivery passages 16 and 17 respectively. The air cleaner is effective to separate dust and other foreign particles from an air stream, indicated by the arrows in FIGURE 1, which moves from the air intake passage 16 to the air delivery passage 17, and thus the cleaner 10 is able to deliver a supply of impurity-free air for use by the internal combustion engine with which it is associated.

In accordance with the present invention, the cleaner 10 achieves effective cleaning of the air stream passing therethrough by first bubbling the air through an oil bath, then directing the air through a labyrinth of oil coated elements, and, finally, passing the air throuyh a fine-screen filter element. In the illustrated embodiment, the air stream enters the air intake passage 16 through a tube 21 whose lower end 22 extends downwardly into an oil bath 23. The oil bath 23 is contained within a cup 24 that is firmly secured to the cleaner housing 15 by a releasable band clamp 25.

In the preferred arrangement, the labyrinth of oil coated elements takes the form of an annular body of oil soaked wire mesh 31 disposed in a chamber 32 directly above the oil bath 23. The close grained mass of wire mesh 31 defines a very large number of tortuous paths through which the air stream, moving upwardly, must pass to reach the delivery passage 17.

Forming the fine-screen filter element is a dry filter assembly 40 disposed between the labyrinth 31 and the delivery passage 17. As a feature of the invention, the preferred filter assembly 40 includes an annular, axially pleated filter element 41 whose end portions 42 and 43 are sealed between the inner edge of the delivery passage 17 and an opposite, removably secured, cap 44. In this way, the assembly 40 provides an unusually large filter area while permitting easy removal of the filter element 41, for cleaning or replacement, through an opening 44a in the housing 15, which is closed by the removable cap 44.

In the illustrated construction, the element 41 is formed of porous, impregnated filter paper which is pleated and fitted between outer and inner concentric metal screens 45, 46 (see FIG. 2). The elements 41 and the screens 45, 46 are held in proper assembled relation by means of upper and lower annular end pieces 47 and 48. The metal screens shield and protect the element 41 from damage when the assembly 40 is handled.

When the assembly 40 is installed, the upper end piece 47 is in sealing engagement with a gasket 51, surrounding the delivery passage 17, and an annular gasket 52 on the cap 44 is in sealing engagement with both the lower end piece 48 and the edge of the opening 44a.

For drawing the cap 44 into assembled relation with the filter element 40, the cap is provided with an annular grommet 56 fitted into a central opening 55 and which is slipped over a threaded stud 57 that is fixed with respect to the cleaner housing 15. In the illustrated embodiment, the stud 57 is secured to a U-shaped bracket 58 whose upper ends 59 are anchored to the inner surface of a short tube 60 that is fixed to the housing 15 to define the air delivery opening 17. A wing nut 61 is threaded onto the stud 57 to urge the cap 44 against the opening edge 44a and thus sandwich the assembly 40 between the gaskets 51, 52.

When required the wing nut 61 is unthreaded and the cap 44 removed so that the filter assembly 40 can be easily slipped from the cleaner housing 15 and shaken to dislodge the dirt particles which eventually pile up on the element 41. If necessary, the entire assembly 40 can be replaced with ease.

To briefly summarize the operation of the air cleaner 10, and turning to the diagrammatical FIG. 3, the air from the air intake passage 16 of the cleaner is first directed downwardly by the tube 21 and bubbled upwardly through the oil bath 23. Much of the dirt and foreign material carried by the air is trapped and suspended in the oil of the oil bath, but some dirt particles 71 are entrained in the air bubbles 72 passing upwardly through the oil bath and these dirt particles escape into the chamber 32.

After bubbling through the oil bath, the air passes through the wire mesh labyrinth 31 in which the individual elements 73 of the mesh force the air stream to wind in tortuous paths as it moves upwardly through the chamber 32. The tortuous paths are many times wider than the foreign particles carried by the air stream. However, most of the remaining dirt particles are unable to follow the serpentine paths through the labyrinth 31 and thus their paths 74 lead them to strike, and be held by, the oil coated elements 73 of the mesh.

A very small percentage of extremely fine particles are carried by the air stream along paths 75 which avoid the oil coated elements of the labyrinth, and these particles are arrested and removed from the air stream as it passes through the very fine screen of the porous filter element 41.

Tests indicate that the oil bath and labyrinth are effective to remove approximately 98.5% of the dust, dirt and other foreign particles in an air stream. The remaining 1.5% are extremely fine particles which, nevertheless, are potentially harmful to an internal combustion engine. The dry filter element embodied in the cleaner 10 arrests a substantial proportion of the fine particles, so that the cleaner as a whole has been found to remove 99.5% of the total amount of foreign material carried by the incoming air stream.

As will be understood by those skilled in this art, the oil bath 23 and labyrinth 31 can absorb a great deal of dirt and foreign material without losing their effectiveness in cleaning the air passing therethrough. And, since the filter element 41 is called up to filter out only a very small percentage of the total amount of dirt trapped by the cleaner 10, it too remains effective over many hours of operation.

It can also be seen that the exceptionally compact filter element 40, because of its annular construction, affords a large area of filtering surface which is even further increased by the pleated construction of the filter member 41. The large filtering area minimizes the inherent obstructive effect of a fine-screen filter to the passing air stream and further increases the service-free operating period of the cleaner.

It is an important feature of the invention that the cleaner 10 will not continue to operate inefficiently, but will warn the engine operator that the cleaner requires servicing when it becomes so choked with dirt as to be ineffective. As will be appreciated by those skilled in the art, the oil bath 23 and the labyrinth 31 eventually separates and traps so much dirt and foreign material from the air stream that they lose their cleaning effectiveness. Inherently however, the air stream continues to flow from the tube 21 and through the labyrinth 31, even though no further dirt separation takes place. Such a dirt laden air stream would, of course, be quite harmful if delivered to an internal combustion engine.

In the cleaner 10, however, the heavy concentration of dirt is trapped by the filter member 41 and quickly blocks the pores of the member. This interrupts the air flow through the cleaner and causes the engine associated with the cleaner 10 to "choke down" and thus warn the operator that the cleaner requires servicing.

In other words, the filter member 41 is of sufficient size that it easily handles the small percentage of remaining dirt carried by the air stream when both the bath 23 and the labyrinth 31 are operating effectively. However, when these latter elements finally become clogged and ineffective after a long period of heavy-duty operation, the rapid increase in foreign material which is trapped by the member 41 causes the cleaner to suddenly interrupt the air stream delivered from the discharge opening 17.

This operating characteristic is illustrated by the Fig. 4 chart, which shows a substantial air flow through the cleaner for a relatively long operating period. This air flow gradually decreases as the member 41 continues to arrest the small percentage of particles which escape the bath 23 and the labyrinth 31. When the bath and labyrinth finally become choked and ineffective, the member 41 becomes rapidly blocked and the air flow through the cleaner drops off sharply. It will be noted that at no time does the cleaner permit harmful dirt to be transmitted through the air discharge opening 17.

I claim as my invention:

1. An air cleaner for an air intake system having air intake and air delivery passages comprising, in combination, an oil bath, a tube extending down into said bath and being in communication with said air intake passage, a chamber overlying and in communication with said bath, oil soaked wire mesh defining a close grained labyrinth in said chamber, having tortuous paths therethrough wider than foreign particles suspended in the air and encountered under normal operating conditions, said oil bath and said oil soaked wire mesh removing the major portion of said particles from the air passing from the air intake to the air delivery passage, said chamber also being in communication with said delivery passage, and a dry filter paper element interposed between said chamber and said delivery passage, said element having apertures smaller than the width of said foreign particles, said smaller apertures removing the remaining portion of said foreign particles not removed by said oil bath and said oil soaked wire mesh and becoming clogged when said oil bath and said oil soaked wire mesh are no longer effective to remove the major portion of said foreign particles, whereby a rapid cut off of the air flow through the air cleaner occurs.

2. An air cleaning assembly for use on farm tractors and the like comprising, in combination, means forming a continuous passage having an inlet and an outlet, a first particle separating means in said passage for receiving dirty air from the inlet and comprising a liquid bath with means for directing all entering air beneath the surface of said bath whereby a large portion of the dirt particles in the air are trapped in the liquid irrespective of particle size, said bath providing a settling chamber for collecting the dirt particles removed from the air bubbling from the liquid, a second particle separating means comprising a maze having a multiplicity of tortuous paths of substantial length each wider than the largest particle normally present in the air encountered under normal operating conditions and each bounded by irregularly shaped surfaces which are wetted with said liquid to provide a multiplicity of areas against which dirt particles impinge and the particles entering the maze have a very high probability of being removed from the air stream, said first and second particle separating means removing the major portion of the dirt particles from the dirty air, and a third particle separating means in the passage for receiving the remaining portion of the dirt particles of the nearly cleaned air from the maze which were not removed by said first and second particle separating means, said third particle separating means comprising a porous wall of large area and negligible thickness having passages too small to pass particles of significant size and too numerous to afford substantial air resistance until said first and second separating means become clogged and lose their dirt-separating ability, said third particle separating means becoming clogged when said first and second particle separating means become clogged and lose their dirt-separating ability, whereby a rapid cut off of the air flow through the air cleaning assembly occurs.

References Cited in the file of this patent

UNITED STATES PATENTS

| | | |
|---|---|---|
| 961,423 | Sturtevant | June 14, 1910 |
| 2,509,510 | Lee | May 30, 1950 |
| 2,510,440 | Vokes | June 6, 1950 |
| 2,570,623 | Wistor | Oct. 9, 1951 |
| 2,732,031 | Rabbitt et al. | Jan. 24, 1956 |
| 2,770,320 | Dreznes | Nov. 13, 1956 |

FOREIGN PATENTS

| | | |
|---|---|---|
| 249,464 | Great Britain | Aug. 14, 1925 |